US008484576B2

(12) United States Patent
Berson et al.

(10) Patent No.: US 8,484,576 B2
(45) Date of Patent: Jul. 9, 2013

(54) SYSTEM AND METHOD FOR CUSTOMIZING MULTIPLE WINDOWS OF INFORMATION ON A DISPLAY

(75) Inventors: Barry L. Berson, Northridge, CA (US); Larry J. Bialecki, Canyon Country, CA (US); Peter A. Buck, Valencia, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 3189 days.

(21) Appl. No.: 10/420,117

(22) Filed: Apr. 17, 2003

(65) Prior Publication Data

US 2004/0210847 A1 Oct. 21, 2004

(51) Int. Cl.
*G06F 3/048* (2006.01)
(52) U.S. Cl.
USPC ............................ 715/788; 715/783; 715/781
(58) Field of Classification Search
USPC .................................. 715/792, 788, 781, 783
See application file for complete search history.

(56) References Cited

U.S. PATENT DOCUMENTS

| | | | | |
|---|---|---|---|---|
| 5,487,143 | A * | 1/1996 | Southgate | 715/790 |
| 5,668,542 | A | 9/1997 | Wright | |
| 5,689,665 | A * | 11/1997 | Mitsui et al. | 715/803 |
| 5,712,995 | A * | 1/1998 | Cohn | 715/792 |
| 5,714,971 | A * | 2/1998 | Shalit et al. | 715/804 |
| 5,734,380 | A * | 3/1998 | Adams et al. | 715/804 |
| 5,758,111 | A * | 5/1998 | Shiratori et al. | 715/788 |
| 5,771,042 | A * | 6/1998 | Santos-Gomez | 715/800 |
| 6,008,809 | A * | 12/1999 | Brooks | 715/792 |
| 6,112,141 | A | 8/2000 | Briffe et al. | |
| 6,281,896 | B1 * | 8/2001 | Alimpich et al. | 715/781 |
| 6,310,631 | B1 * | 10/2001 | Cecco et al. | 715/792 |
| 6,381,519 | B1 | 4/2002 | Snyder | |
| 6,396,516 | B1 | 5/2002 | Beatty | |
| 6,456,306 | B1 | 9/2002 | Chin et al. | |
| 6,466,235 | B1 | 10/2002 | Smith et al. | |
| 6,493,008 | B1 * | 12/2002 | Yui | 715/840 |
| 6,512,527 | B1 | 1/2003 | Barber et al. | |
| 2001/0022592 | A1 * | 9/2001 | Alimpich et al. | 345/781 |
| 2004/0059474 | A1 | 3/2004 | Boorman et al. | |
| 2005/0007386 | A1 | 1/2005 | Berson | |

OTHER PUBLICATIONS

Slope Indicator, MutiMon Software, Apr. 2002, pp. 85-86, Mukilteo, WA, USA.
Avidyne, FlightMax Entegra Integrated Flight Deck PFD with Integrated ADAHRS, http://wwww.avidyne.com/Entegra/Entegra_PFD.htm, Mar. 5, 2003.

(Continued)

*Primary Examiner* — Tadeese Hailu

(57) ABSTRACT

A device for monitoring the status of a plurality of subsystems includes a plurality of mutually exclusive windows on a display device. Each window includes information related to at least one of the subsystems. One or more of the windows includes a common user interface and a common display area for a subset of at least two of the windows. The common user interface includes selectable options for controlling the information displayed in the common display area, and the selectable options allow the user to display more detailed information related to the information displayed in one of the associated windows. Advisory information regarding the status of the subsystems can be included in one or more of the windows, along with a selectable option to display a checklist for the subsystem associated with each advisory message. The display system can be used to monitor operation and status of various types of systems including mobile vehicles, machines, biological organisms, and building facilities.

2 Claims, 7 Drawing Sheets

OTHER PUBLICATIONS

Avidyne, EMax Engine Monitor and Fuel Totalizer for FlightMax EX5000C, http://www.avidyne.com/EX5000C/emax.htm, Mar. 5, 2003.

Avidyne, FlightMax Entegra Integrated Flight Deck Specifications, http://www.avidyne.com/Entegra/Entegra_Specs.htm., Mar. 5, 2003.

Avidyne Corporation, FlightMax EX500 Integrated Datalink Multi-Function Display Pilot's Guide, Mar. 2003, pp. 1-60, Lincoln, MA, USA.

Avidyne Corporation, FlightMax Entegra Primary Flight Display Pilot's Guide, Feb. 2003, pp. 1-34, Lincoln, MA, USA.

Sofrelog, Products Vessel Traffic Services—Operational Features, http://www.sofrelog.com/operational_features_vts.htm, Feb. 28, 2003.

Sofrelog, Image, http://www.sofrelog.com/images/11_large.jpg, Mar. 6, 2003.

Sofrelog, Image, http://www.sofrelog.com/images/12_large.jpg, Mar. 6, 2003.

\* cited by examiner

SYSTEM AND METHOD FOR CUSTOMIZING MULTIPLE WINDOWS OF INFORMATION ON A DISPLAY

BACKGROUND OF THE INVENTION

There are many situations in which one or more people monitor information regarding the status and performance of the same system. As computerized display systems become increasingly commonplace, more information from a variety of systems and subsystems is available for display on a computer monitor. The systems may be stationary, such as power plants, or mobile, such as boats or airplanes. In either case, the interface between two or more operators with the system must often be coordinated, with each having access to the same information, while allowing only one to provide input to a particular subsystem at a time.

There are other situations, however, when two or more operators can perform separate tasks relevant to the same system or subsystem independently of one another. In such situations, it is often more convenient for each operator to have the ability to access different types of information regarding the system that is most relevant to the task being performed.

Further, the size and number of operator controls and displays is often limited due to space, weight, power consumption, and cost considerations. This is especially true in highly mobile systems such as airplanes.

Systems capable of displaying information on multiple monitors are currently available. For example, the various versions of the Windows Operating System from Microsoft Corporation allows a user to connect multiple monitors to a host computer, configure the monitors to display different windows of information, and provide input to different application programs executing on the host computer using devices such as a keyboard and mouse. User interfaces and information output from the different application programs can be displayed on one or more of the monitors, thereby providing a "multi-tasking" environment for the user. A user can position and size the "windows" on the display for each application program as desired. Additionally, remote users can log into a particular host computer via a network interface, view copies of the user interfaces and information generated by the application programs, as well as provide input to the application programs via the user interfaces.

The display windowing capability in a personal computer environment typically does not allow two or more users to simultaneously view different information using the same copy of the application program. In order to provide this capability, different copies of the same application program must be invoked or executed by each user. Common information can be shared between copies of the application program via a database. Depending on the application program, a user can often invoke the same application program in two or more windows to display different information from the common database, as well as interface with different portions of the application program in each window.

One drawback with known display windowing capability, such as the Microsoft Windows Operating System, is the lack of a common interface to interact with various portions of each copy of the application program, or even with two windows running different applications programs. The interface menus and options are repeated in each window, which wastes valuable display area and creates an inefficient user interface for the application program.

Another drawback with known display windowing capability is that each time the user invokes another copy of the application program, the associated window appears in the middle of the display. The window typically obscures some or all of the information in the other windows on the display, and must be manually resized and moved to the desired location on the display. Resizing and repositioning windows can be a very cumbersome and inefficient process, especially when the operator is performing critical tasks, such as responding to an alarm, under time constraints.

Some application programs use a feature referred to as "frames", which are multiple, independently controllable sections on a display. On web pages with frames, for example, each frame section is built as a separate hypertext markup language (HTML) file with one "master" HTML file to identify all of the frame sections. When a user requests a web page that uses frames, the address requested is actually that of the "master" file that defines the frames. The result of the request is that multiple HTML files are returned, one for each visual frame section. Links in one frame can request another file that will appear in another (or the same) frame. A typical use of frames is to have one frame containing a selection menu and another frame containing the space where the selected files will appear. A user cannot dynamically control the type of information that is displayed in each frame, or the size or location of each frame on the display, however. The application program that generates the display must be reprogrammed offline to alter the size, location, and content in the frames.

Other software programs, such as gaming applications, generate displays on different monitors from each participant's viewpoint. Each participant has a set of input devices to control various aspects of the game. In some programs, a user can select options to display various types of information relevant to their participation in the game. Similar to the frames feature discussed hereinabove, however, the position, size, and content of the information cannot be dynamically customized by the user, nor is a common window for displaying more detailed information for any selected frame available.

SUMMARY OF THE INVENTION

A display system that provides the capability to monitor information and to interface with various subsystems via a user interface on a display is disclosed. The user interface includes selectable options that allow the user to access more, or less, detailed information regarding a selected subsystem. In some embodiments, one portion of the display can include an interface that is common to two or more windows. A common display area can be included with the common interface, in which the more detailed information is displayed. The requested information is presented without obscuring the other information currently being displayed.

In other embodiments, two or more operators monitoring functions or performing tasks relative to the same system can configure their displays independently to view selected information that is most pertinent to the tasks being performed and the functions being monitored.

Operators can further modify the amount of display area allotted to a particular window of information, and the other windows on the display are automatically resized so that each window occupies a mutually exclusive, non-overlapping area on the display.

The capability to customize the information in one or more windows in display allows operators to configure a display that is most useful to them. Login information can be shared across display systems via network to allow the user to access saved configurations from any display system connected to the network. Various embodiments of the display system can include a single or multiple customizable displays, and are useful in monitoring and controlling a wide variety of systems, and even groups of various systems.

Other features enable compliance with government regulations or other guidelines by displaying information considered necessary during certain phases of operating or monitoring a system.

Still other features provide the ability to display a preset window configuration based on the user's role in monitoring and/or controlling the system. When the user switches roles, a different default or preset window configuration can be presented that includes information most useful to the new role being performed by the user.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

Figure 1:
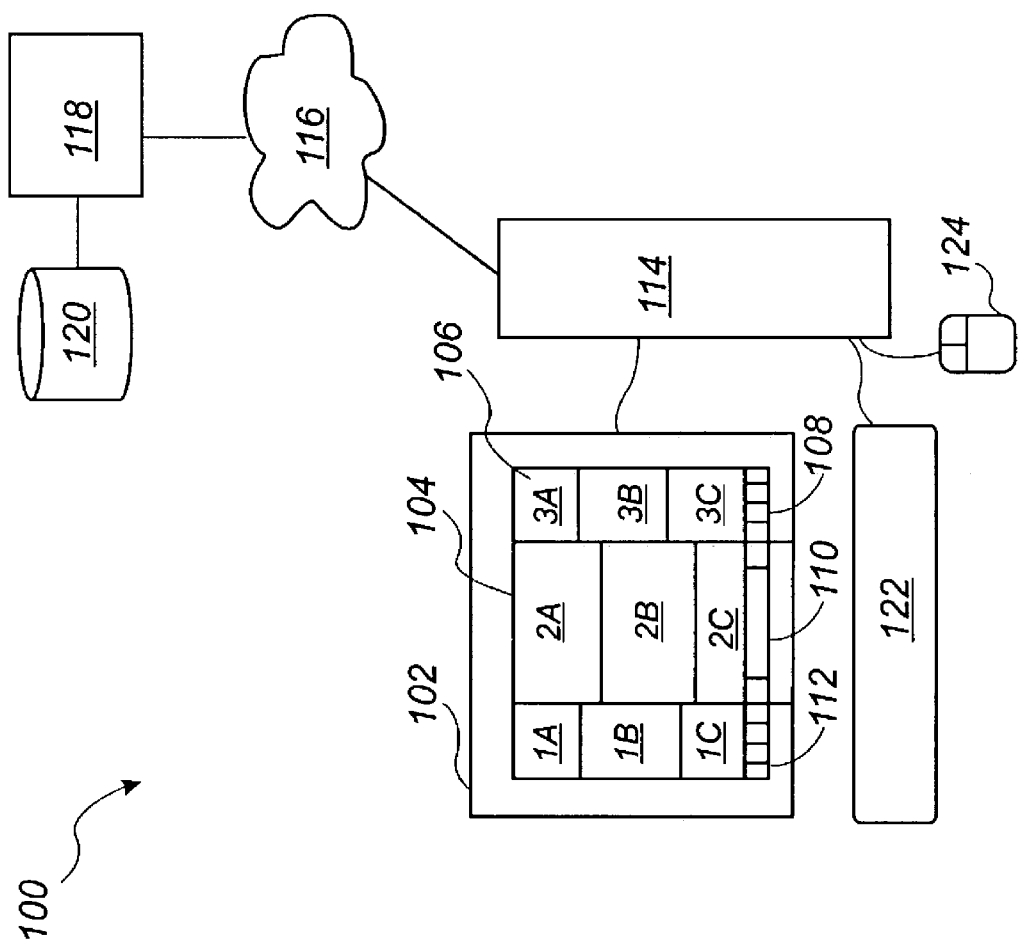
FIG. 1 is a diagram of an embodiment of an information display system.

FIG. 1 shows a diagram of an embodiment of an information display system 100 that includes a display device 102 with display area 104. A display 106 presented in display area 104 is partitioned into several mutually exclusive display areas, referred to as windows 1A through 3C. Various types of information can be displayed in windows 1A through 3C based on the types of functions being performed by components in display system 100, devices being monitored via display system 100, and functions performed by devices that communicate with display system 100.

One or more of windows 1A through 3C, such as windows 1C, 2C, and/or 3C, can be designated as common windows associated with a subset of two or more of the remaining windows 1A, 1B, 2A, 2B, 3A, 3B. For example, window 1C can be a common window associated with windows 1A through 1B; window 2C can be a common window associated with windows 2A through 2B; and window 3C can be a common window associated with windows 3A through 3B. Other arrangements and combinations of window subsets and common windows can be utilized based on the types of information a user will be viewing, and the utility of having a common window 1C, 2C, and/or 3C associated with two or more of the other windows 1A, 1B, 2A, 2B, 3A, 3B.

An option area 108, 110, 112 can be associated with each common window 1C, 2C, 3C, respectively, to allow the user to customize the information in common windows 1C, 2C, and 3C. The capability to customize the information in one or more common windows 1C, 2C, and 3C provides user configurable workspace on display 106 while retaining the information in areas 1A and 1B. For example, options area 108 can include several options for displaying more detailed information in common window 1C that is related to the information displayed in either of windows 1A or 1B. Common window 1C can include a scroll feature to allow the user to scroll through the detailed information, while the less detailed information continues to be displayed in windows 1A and/or 1B.

Processing system 114 communicates with display device 102, and includes logic instructions to generate display 106. Processing system 114 can be configured to communicate with the other components in display system 100 via network 116. Other components in display system 100 can include, for example, one or more other processing systems 118, and one or more databases 120. Various input/output devices, such as keyboard 122, mouse 124, touchscreen (not shown), light pen pointing device (not shown), printer (not shown), speakers (not shown), light indicators, and voice recognition and response system (not shown), to allow a user to interact with display 106 can also be included. Processing system 114 can be any suitable computer processing device that includes memory for storing and executing logic instructions, and is capable of interfacing with display device 102.

Additionally, processing system 114 can be embodied in any suitable computing device, and so includes personal data assistants (PDAs), telephones with display areas, network appliances, desktops, laptops, X-window terminals, or other such computing devices. Processing system 114 and corresponding logic instructions can be implemented using any suitable combination of hardware, software, and/or firmware, such as microprocessors, Field Programmable Gate Arrays (FPGAs), Application Specific Integrated Circuit (ASICs), or other suitable devices.

Other devices can also be connected to processing system 114 such as an audio system, a data storage drive, and other input/output devices. Application software with logic instructions that are executed by processing system 114 can be stored on a computer readable medium, or accessed by processing system 114 in the form of electronic signals modulated in accordance with the application and data communication technology when accessed via network 116.

Processing system 114 can be configured to connect to network 116 via a suitable communication link such as a T1, ISDN, or cable line, a wireless connection through a cellular or satellite network, or a local data transport system such as Ethernet or token ring over a local area network.

Logic instructions that are executed by processing system 114, or another component in display system 100, can be included to determine when functions being performed in display system 100 are in a predefined state. The logic instructions can also monitor the operational status of various components in display system 100. When the logic instructions in processing system 114 detect one of the predefined states, relevant information regarding the state can be presented in one of windows 1A, 1B, 2A, 2B, 3A, or 3B. In some circumstances, the user cannot change the information regarding the state while the system remains in the state. The user can, however, choose options associated with the respective common window 1C, 2C, or 3C to retrieve more information about the detected state, as well as information related to the information in other associated windows 1A, 1B, 2A, 2B, 3A, and/or 3B.

In some embodiments, display 106 covers the entire visible display area 104 of display device 102. Additionally, windows 1A through 3C do not overlap each other, thereby providing the user with an unobstructed view of all the information on display 106.

The selectable features in option areas 108, 110, and 112 that allow the user to customize common windows 1C, 2C, and 3C can be implemented in any suitable manner, such as computer-generated graphic features that are selectable via a touch screen overlaid on display area 104, a movable cursor on display 106, and/or with hardware features such as pushbutton switches that are mounted adjacent display device 102. In other embodiments, the selectable options to customize common windows 1C, 2C, and 3C can be located on other components of display system 100, or other suitable areas, that are accessible by a user. In some embodiments, a voice recognition system can be included to interact with displayed information.

Figure 3:
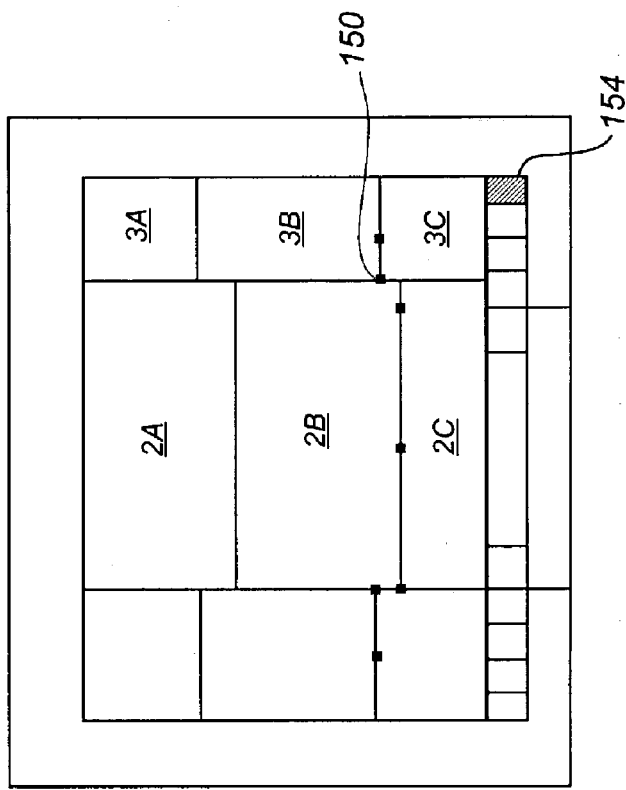
FIG. 3 is a diagram of the display of FIG. 2 with windows that have been resized using the selectable window-resizing feature.
Figure 2:
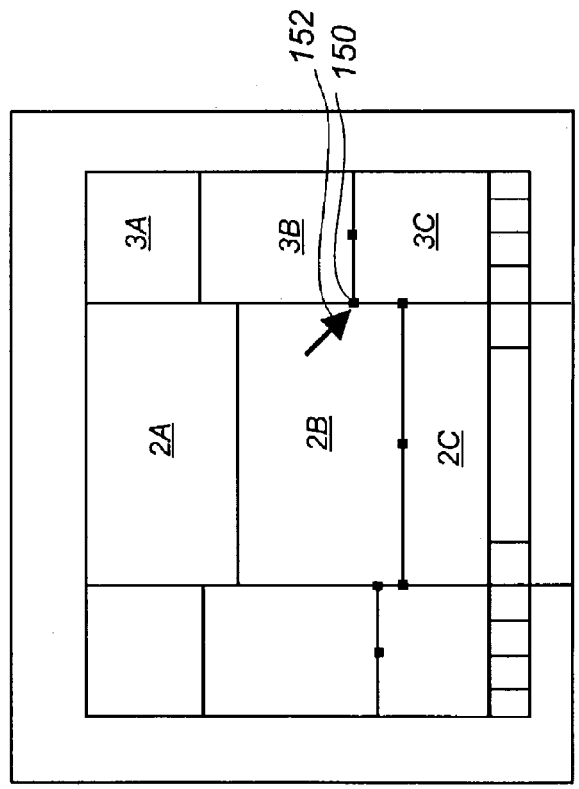
FIG. 2 is a diagram of an embodiment of a selectable window-resizing feature that allows a user to change the size of display windows.

A window-resizing feature can be included in some embodiments to allow the user to change the size of display windows 1A through 3C. The resizing feature can be implemented in any suitable manner and on any one window or group of windows. For example, FIGS. 2 and 3 show nodes 150 around the edges and/or at the corners of windows 1C, 2C, and 3C. To change the size of window 3C, the user selects node 150 with cursor 152 and uses mouse 120 (FIG. 1) to drag node 150 across display area 104 until window 3C is the desired size. The sizing feature can also include logic to automatically resize the width and height of surrounding windows 2A, 2B, 2C, and 3B to prevent overlap among windows 1A through 3C as the user changes the size of the selected window. Once window 3C is resized, a selectable option 154 (FIG. 3) can be displayed to allow the user to quickly restore windows 2A, 2B, 2C, and 3B to their previous size, or to a default size. Additionally, upper and lower size limits can be imposed to prevent the user from resizing windows 1A through 3C outside a predetermined range of sizes.

Figure 4:
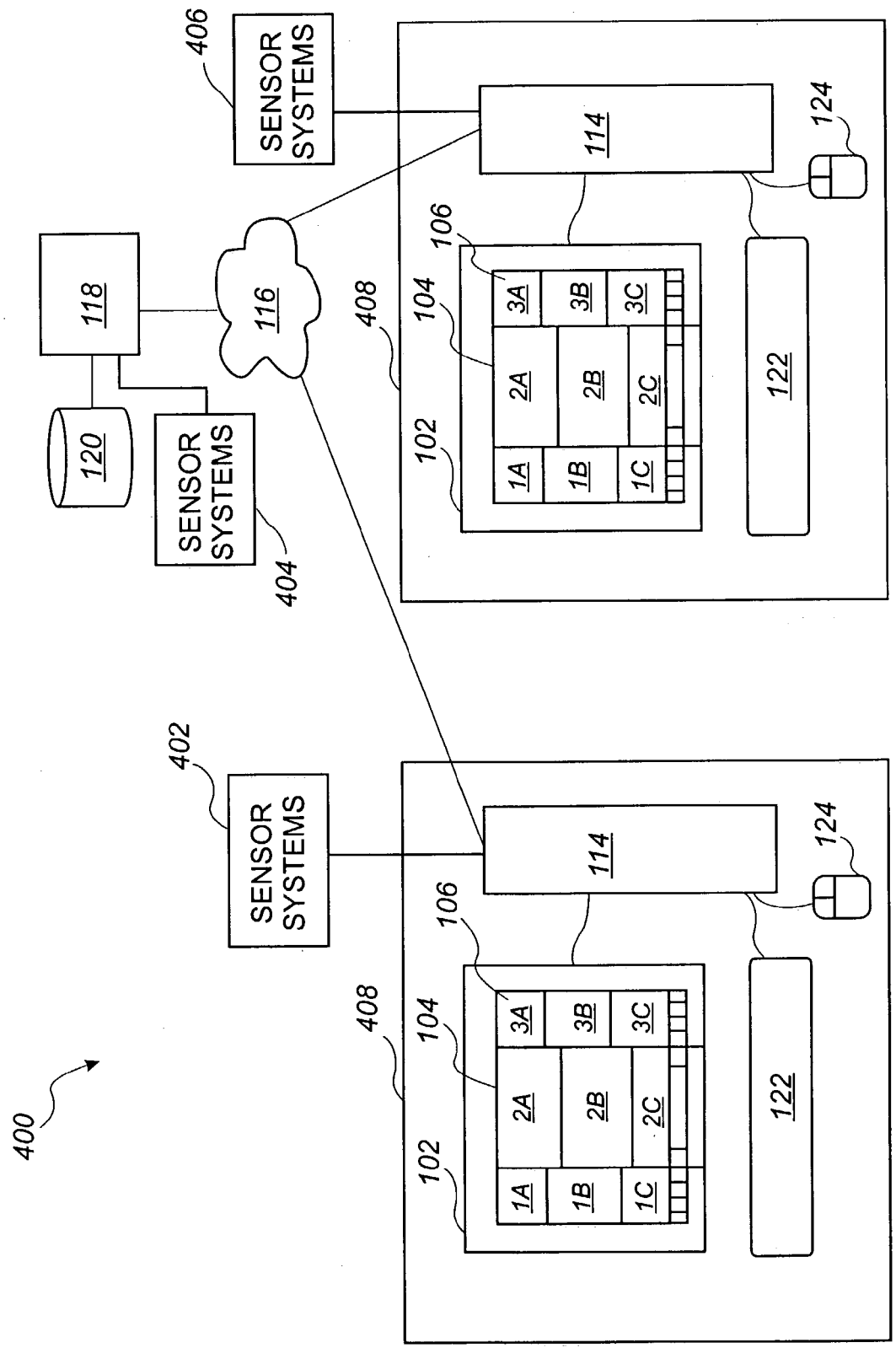
FIG. 4 is a diagram of an embodiment of a display system with one or more sensor systems that are configured to monitor the status of components and functions within and/or outside of the display system.

FIG. 4 shows an embodiment of a display system 400 with one or more sensor systems 402, 404, 406 that are configured to monitor the status of components and functions within and/or outside of display system 400. Various types of sensors can be included in sensor systems 402, 404, 406, based on the type of components and functions being monitored and the information to be displayed. Sensor systems 402, 404, 406 are shown as being configured to provide input to processing systems 114 and 118, however it is not necessary for a sensor system 402, 404, 406 to be associated with each processing system 114, 118.

Information regarding one or more components or functions of systems such as mobile vehicles, machines, biological organisms, and/or building facilities, among others, can be provided by data from sensor systems 402, 404, 406. Each system being monitored can include its own group of subsystems. Depending on the number of systems being monitored, windows 1A through 3C can include information regarding one or more of the systems and/or subsystems. When only one system is monitored, display 104 can be dedicated to display information regarding one or more of the subsystems for the system.

For example, sensor system 402 can include sensors to detect a patient's vital signs and organ functions during an operation. Display 104 can include information relevant to the procedure being performed, including sensor data and images. In another embodiment, sensor system 404 can be configured to provide information on each patient in a hospital ward, providing capability to monitor groups of patients in a centralized location from user station 408. Selectable options can be included in option areas 108, 110, 112 (FIG. 1) to allow a user to request more detailed information in common windows 1C, 2C, 3C regarding a particular patient.

Two or more user stations 408 can be configured to communicate with each other, as well as with other processing systems 118 and databases 120, via network 116. Information from sensor systems 402, 404, 406 can be shared among processing systems 114 and 118, as well as stored in processing systems 114, 118 and/or database 120 for later access. User stations 408 can, but are not required to, be located in the same area to allow users to easily coordinate their activities. Custom windows 1C, 2C, and 3C allow each user to customize display 104 to include information relevant to the task being performed by that user, while at the same time having information available on display 104 that is relevant to the information displayed for a system or subsystems in windows 1A, 1B, 2A, 2B, 3A and 3B.

Figure 5:
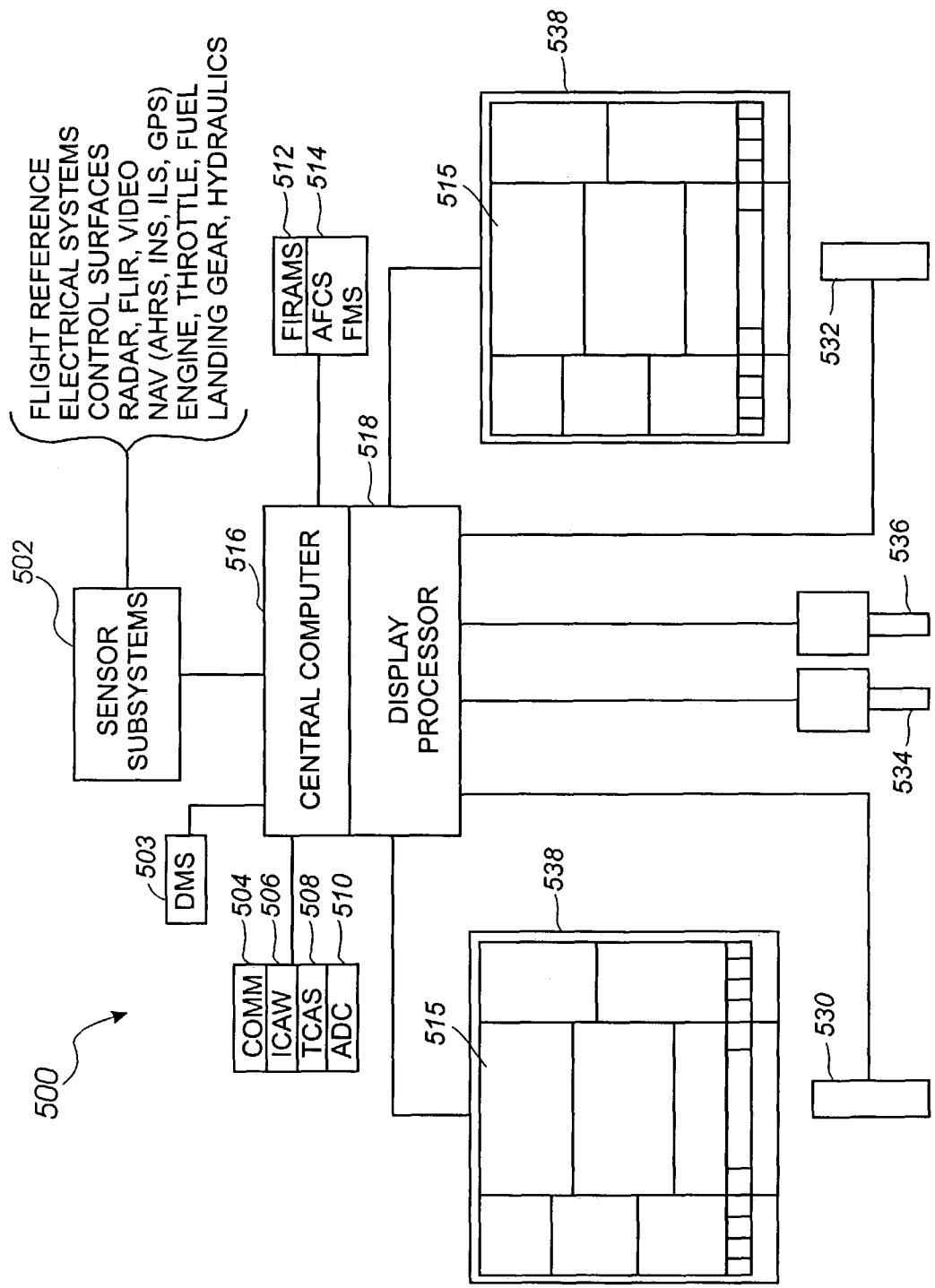
FIG. 5 is a diagram of an embodiment of an aircraft avionics system that includes a variety of subsystems.

As an example of one or more display systems 100 (FIG. 1) being used to monitor a system by one or more operators, FIG. 5 shows a block diagram of an embodiment of an aircraft avionics system 500 that includes a variety of sensor systems 502, Digital Map Set (DMS) 503, communications systems (COMM) 504, cautions and warnings system (ICAW) 506, and terrain clearance and avoidance (TCAS) subsystems 508, air data computer (ADC) 510, flight incident recorder and monitoring set (FIRAMS) 512, and an automatic flight control system (AFCS) 514. The following brief overview of the components in avionics system 500 provides an indication of the complexity of such systems, and the value of having one or more displays 515 that allows crewmembers to customize their displays to control, monitor, and operate the aircraft and its subsystems.

Central computer 516 receives inputs from the avionics components and the crew station(s) including positions of switches, control sticks 530, 532, throttle levers 534, 536, and rudder pedals (not shown). Display devices 538, control sticks 530, 532, and throttle levers 534, 536 can include a variety of switches for controlling the operational modes of displays 515, and aircraft subsystems. Central computer 516 includes logic to determine whether the modes requested by the crewmembers are permitted based on the current mode of the components. Central computer 516 also provides data from sensor systems 502 and other avionics components, as well as the operational mode of the avionics components, to display processor 518, which generates avionics displays 515 and any other indicators, such as lights and sounds. Mode control and option selections are also output from central computer 516 to various avionics components to control their operational modes.

Note that various embodiments of avionics system 500 can be equipped with additional or fewer subsystems, based on the use of the aircraft. Further, redundant subsystems and processing systems can also be included to provide backup capability.

An example of a group of sensor systems 502 that can be included in avionics system 500 includes flight reference sensors; electrical system sensors; control surface position sensors; image sensors including RADAR, FLIR, and video camera(s); navigation sensors including TACAN, AHRS, INS, ILS, and GPS sensors; and sensors that provide information regarding the engine, throttle position, fuel system, landing gear, and hydraulics system.

Flight reference sensors provide information regarding aircraft angle of attack, ambient air temperature outside the aircraft; a pitot static system to measure aircraft velocity with pitot and static pressures surrounding the aircraft; an indicated airspeed (IAS) value based on the pitot and static pressure; a backup pressure altimeter value based on static pressure; and a vertical speed (climb or dive rate) indicator value based on changes in static air pressure.

Electrical system sensors supply information regarding voltages, frequency, power supply status, AC-DC transformer/rectifier status, engine start indicators, and backup batteries.

The Radio Detection and Ranging (RADAR) sensor provides Air-to-air (A/A) and Air-to-ground (A/G) modes for object detection, designation, tracking and navigation. The RADAR sensor also provides terrain avoidance for low level navigation, a detection and tracking capability for moving and stationary surface objects, precision velocity measurement for navigation update, and weather information. The Forward Looking Infrared (FLIR) sensor provides thermal imagery of the surrounding environment in television format. The video camera(s) provide a visual out-the-window scene. The image data from the sensors can be fused to form a composite image of the out-the-window scene. The fused image can be combined with display symbology to provide an enhanced vision display for the crewmembers.

Navigation subsystems typically include Tactical Air Navigation (TACAN), which is used to determine the relative bearing and slant range distance to a TACAN ground station. The TACAN is also used as a source to keep aircraft present position and update the aircraft present position being kept by another source, such as the inertial navigation system (INS) or air data computer (ADC) 510. The INS subsystem is a self-contained, fully automatic dead reckoning navigation system. The INS can be closely coupled to the Global Positioning System (GPS) to provide highly accurate aircraft present position and velocity data. The INS detects aircraft motion (acceleration and attitude) and provides acceleration, velocity, present position, pitch, roll, and true heading to related systems. The GPS is a space satellite based radio navigation system that provides continuous, all weather, passive operation to an unlimited number of users anywhere on the earth. The Attitude Heading Reference system (AHRS) is a self-contained attitude reference system, which provides backup pitch, heading, and roll attitude for use by other subsystems. The Instrument Landing System (ILS) is an all weather runway landing approach guidance system. The ILS decodes transmitted azimuth and elevation signals during an aircraft approach and provides steering information to be displayed on the Head-Up Display (HUD), the Horizontal Situation Indicator Display (HSID), and/or other appropriate displays.

Aircraft communication subsystems (COMM) 504 typically include Very-High Frequency/Ultra-High Frequency (VHF/UHF) communication systems to provide air-to-air and air-to-ground communications. Another communication subsystem that can be found on an aircraft is an Intercommunication and Audio System (IAS) to provide amplification and routing of audio signals within the cockpit, the aircraft, and air traffic controllers. The IAS can also provide supplemental and backup communication, radio navigation, and identification (CNI) controls, aircraft warnings and advisories, and voice alerting. Other communication systems, such as a satellite communication system, and high frequency radio systems, among others, can also be included.

ICAW system 506 filters extraneous messages to inform crewmembers of specific problems. For example, when an engine fails, the generator and hydraulic cautions normally associated with an engine being shutdown are suppressed, and the crewmembers are provided the specific problem in the form of an engine shutdown message.

The Traffic Alert and Collision Avoidance System, or TCAS 508, is an instrument integrated into other systems in an aircraft cockpit. TCAS 508 includes a display showing the relative positions and velocities of aircraft and issues an alarm when another aircraft is on a path to pass within a predetermined range to the subject aircraft.

Air Data Computer (ADC) 510 receives inputs from various aircraft sensors. Any errors in these inputs are corrected in the ADC and the corrected signals are used to compute accurate air data and magnetic heading information. ADC outputs are used for primary flight data displays, navigation, altitude reporting, environment control, and unsafe landing warning.

The Flight Incident Recorder and Monitoring System (FIRAMS) 512 monitors engine and airframe operational status for component failures and caution/advisory conditions when the central computer 516 is operating. If the central computer 516 detects a component failure, central computer 516 commands the FIRAMS 512 to store the applicable maintenance code. When the central computer 516 detects specific unit failures, it commands the FIRAMS 512 to store significant maintenance data and selected tactical information in a memory device.

The automatic flight control system (AFCS) 514 provides autopilot and automatic throttle control (ATC) mode commands to actuators connected to the control surfaces and throttle levers. The autopilot mode maintains a constant heading, altitude, speed, and/or attitude. The ATC mode positions the engine throttle levers and power lever control to maintain a constant angle of attack during landing, with approach power compensation, or constant airspeed during flight with a velocity control system. A flight management system (FMS) can be integrated with the AFCS 514 to allow the crew to select options to fly the most economical flight profile or choose the fastest route to a destination. As the flight proceeds, the FMS can track fuel-burn and winds, update estimated flight time, and automatically change navigation and communication radio frequencies. The FMS can control the flight from takeoff through landing, and perform navigation functions including determining waypoints, course intercepts, estimated time of arrival, holding patterns, altitude crossing restrictions, and optimum holding speed.

Digital Map Set (DMS) 503 can also be included to provide an image of the terrain and obstacles that is overlaid by textual information. For example, the map image from DMS 503 can be overlaid by text and symbols, and the map image can be continuously updated during flight to provide a bird's eye view of the position and heading of the aircraft relative to the terrain and various landmark features to the crewmembers. Current flight path, and deviation from a pre-specified flight path, can also be shown.

Avionics display 515 can replace traditional aircraft instrument panels to provide crewmembers with an interactive display of the primary flight information, control operation of various subsystems on the aircraft, as well as allowing crewmembers to view information from the various subsystems at any particular time.

Figure 6:
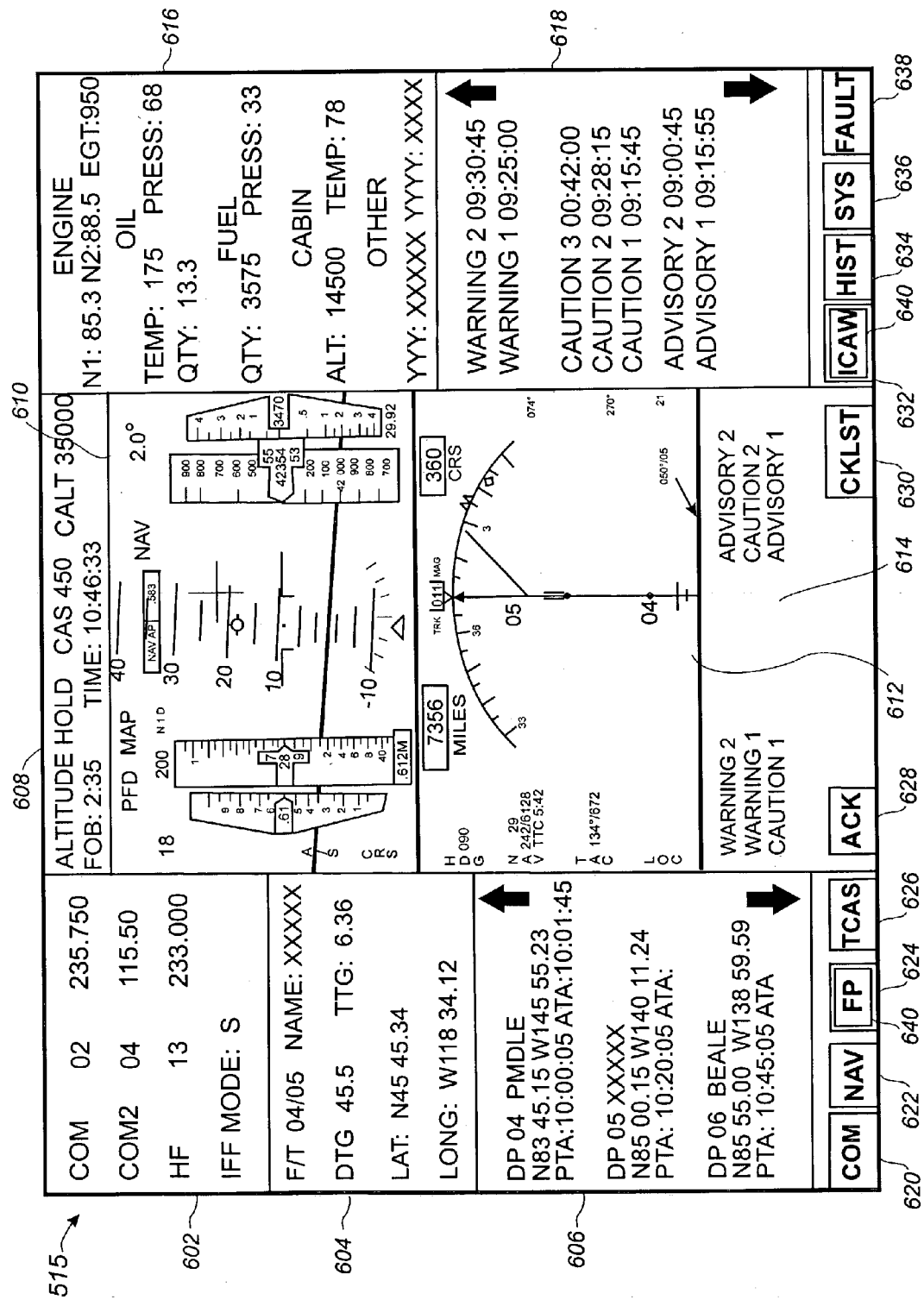
FIG. 6 is a diagram of an embodiment of an avionics display that includes information regarding the avionics system of FIG. 5.

FIG. 6 shows an embodiment of avionics display 515 that includes information regarding avionics system 500 (FIG. 5). Display 515 includes communication system window 602, navigation window 604, common window 606 (currently displaying navigation waypoint information), primary information window 608, Head Up Display (HUD) window 610, Horizontal Situation Indicator display (HSID) window 612, common window 614 (currently displaying caution and warning information), engine status window 616, and common window 618 (currently displaying cautions and warnings information). HUD window 610 provides flight attitude, altitude, speed, and navigation steering information. HSID window 612 provides aircraft attitude, steering, and navigation information superimposed on a moving map of the geographic area around the aircraft that is generated by DMS 503 (FIG. 5).

The embodiment of avionics display 515 shown in FIG. 6 also includes communication subsystems (COM) option 620, navigation subsystems (NAV) option 622, flight planning subsystem (FP) option 624, traffic alert and collision avoidance subsystem (TCAS) option 626, acknowledge (ACK) option 628, checklist (CKLST) option 630, integrated cautions and warnings (ICAW) subsystem option 632, subsystem history (HIST) option 634, subsystem (SYS) option 636, and subsystem diagnostics (FAULT) option 638. Crewmembers can choose options 620 through 638 to view more detailed information about the aircraft's operation and subsystems in common windows 606, 614, and 618.

The options shown for common window 606 include Com option 620 to view more detailed information regarding the aircraft's communication system 604; NAV option 622 to view information about various aspects of navigating the aircraft; FP option 624 to review and modify the aircraft's flight plan; and TCAS option 626 to view more information regarding other aircraft or obstacles in the vicinity of the aircraft. When a particular one of options 620 through 626 is selected, an indicator of the option selected, such as selected box 640 or lighted pushbuttons, can be utilized. For example, a green light can indicate a selected option, and white light can indicate the option is available for selection.

Figure 7:
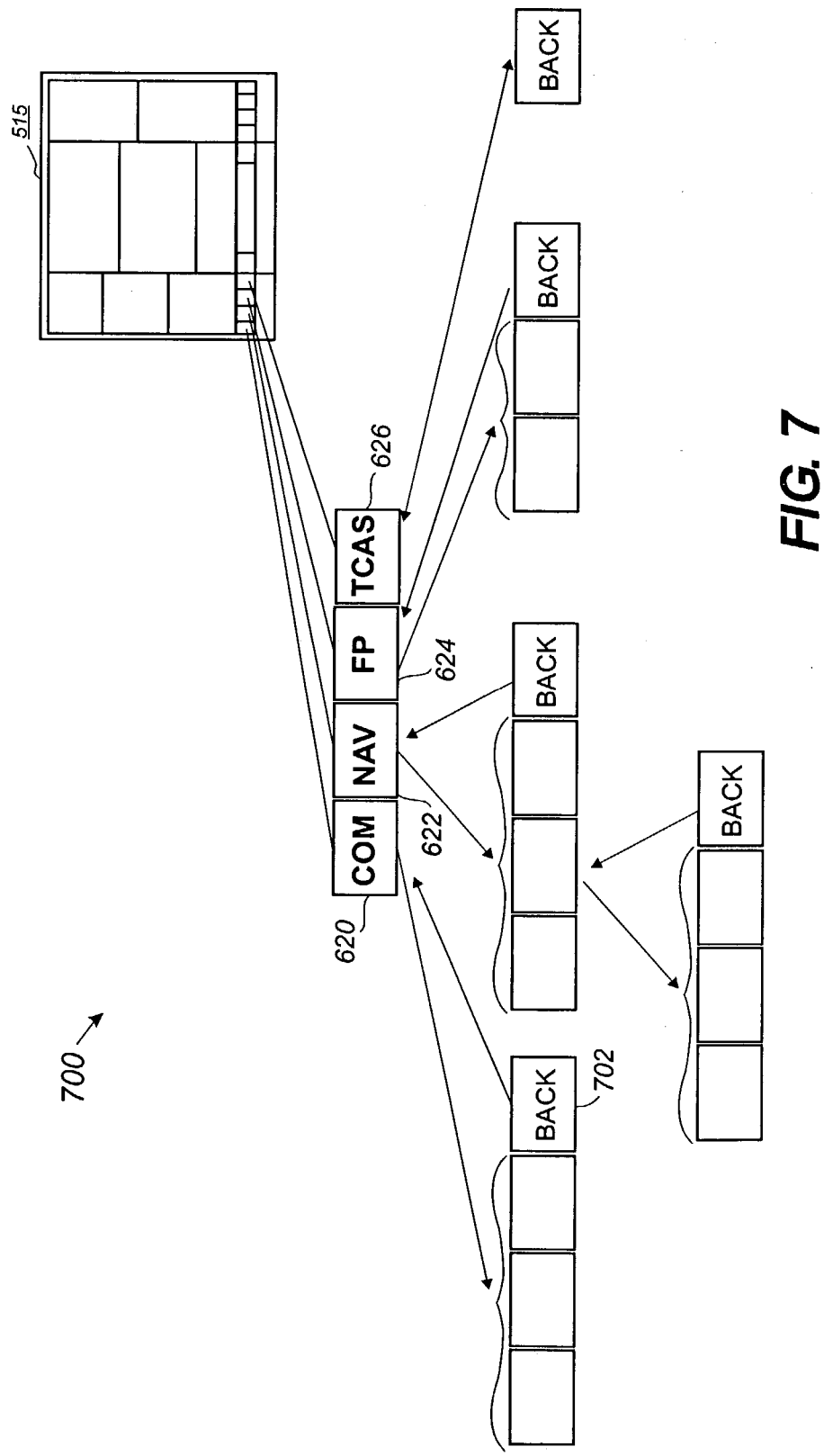
FIG. 7 is a diagram of an embodiment of a display option tree that allows each crewmember to access increasingly detailed levels of information in common windows of the avionics display of FIG. 6.

When a particular one of options 620 through 626 is selected, the information in common window 606 changes to display with information requested by the user. Referring to FIGS. 6 and 7, FIG. 7 shows an embodiment of a display option tree 700 that can be implemented to allow each crewmember to access increasingly detailed levels of information in common windows 606, 614, 618 independently from one another. While a first crewmember is monitoring engine performance, for example, the other crewmember can view and change the flight plan. Additionally, when COM option 620 is selected by one crewmember, options 620 through 626 on his display 515 change to another set of options to access another level of information that is available for the selected COM option 620. The sublevels include a feature, such as BACK option 702, to return to the previous level. In the meantime, the information on the other crewmember's display 515 is unaffected, unless the option selected by the first crewmember changes the operating mode or other information that is common to both displays 515.

Acknowledge (ACK) option 628 and checklist (CKLST) option 630 are associated with the Integrated Caution Advisory and Warning subsystem (ICAW) 606. In the embodiment of display 515 shown, messages generated by ICAW system 606 appear in window 614. A limited number of individual ICAW messages can appear at one time in window 614, and additional information about the messages can appear in window 618 when ICAW option 632 is selected. The ICAW messages in window 614 can be cleared by selecting ACK option 628. When additional messages are available, they replace the caution and warning messages that are cleared when ACK option 628 is selected.

ICAW subsystem 506 (FIG. 5) includes an electronic checklist feature that is accessed via CKLST option 630. When an ICAW message is displayed in window 614, the crewmember can depress CKLST option 630 to view the associated checklist in window 614. When multiple ICAW messages occur, the crewmember can move an indicator over the desired ICAW and select ICAW option 632 to view a checklist for the problem indicated by the message. Associated checklists can be automatically linked together so that if an engine failure occurs, the pilot will not only get the checklist for the engine failure procedure in-flight but also the single engine landing checklist. Crewmembers can also manually page through the checklists at any time by selecting CKLST option 630.

Subsystem history (HIST) option 634 can be selected to display operational history for the subsystem selected with subsystem (SYS) option 636. FAULT option 638 can be selected to initiate diagnostic procedures, commonly referred to as Built-in-Tests (BIT), on the selected subsystem. The results of the BIT are displayed in window 618. As shown in FIG. 7 for options 620 through 626, various sublevels of options can be implemented for options 628 through 638, including a display navigation feature, such as BACK option 702, to return to the previous level.

Referring to FIGS. 5 and 6, in some embodiments, central computer 516 determines whether the aircraft is in a predefined state, and instructs display processor 518 to display predefined information in at least one of windows 602 through 616 while the aircraft remains in the predefined state. Additionally, options 620 through 638 can be changed or enabled/disabled depending on the aircraft state. For example, when the aircraft is on final approach to land, one or both of the crewmember's displays 515 can be forced to display primary flight information or other information considered necessary to conduct that portion of the flight in windows 510 and 512, as well as other windows on display 515.

Various other techniques for controlling the content in common windows 606, 614, and 618 can be provided. For example, a "drag and drop" feature can be provided as another method of displaying more detailed information about one or more of the subsystems. The drag and drop feature allows a user to select a word or other item in one of windows 602, 604, 608, 610, 612, or 616, and drag the selection to one of common windows 606, 614, or 618. Information regarding the selected item is then displayed in the common window in which the item was dropped. For example, selecting a particular caution in window 614 and dropping it in window 618 would cause information regarding the relevant subsystem to be displayed in window 618.

Other techniques for controlling the appearance of display 515 can also be provided, such as automatic and manual declutter display modes, voice recognition and response systems, color-coding, and display scaling. Further, other combinations of information and number/size of windows can be implemented for display 515. A lock out feature can also be included to help crewmembers coordinate their efforts by preventing them from attempting to control operation of the same subsystem simultaneously. Alternatively, control can be given to the last crewmember who makes an input.

Display 515 minimizes the number of dedicated control panels and displays that are typically used to monitor and operate an aircraft and its subsystems. A reduced number of display devices 538 results in decreased weight, increased system reliability, and reduced maintenance. Further, displays 515 provide enhanced situational awareness of the aircraft and the subsystems, and reduce crew workload from typical pilot-vehicle interfaces.

Aircraft avionics system 500, various aspects of which are shown in FIGS. 5, 6, and 7, was discussed herein as an example of a type of system in which various embodiments of a display with customizable windows can be used to monitor and control a large number of subsystems. It is anticipated that such a customizable display 106 (FIGS. 1 and 4), 515, or group of displays, will be useful in monitoring and controlling a wide variety of systems, and even groups of various systems. Such variety of systems can include, for example, one or more mobile vehicles such as automobiles, trains, and boats; one or more machines such as robotic or manually operated manufacturing equipment and excavators; biological organisms such as a patient undergoing surgery, a group of patients in a hospital ward, viruses, and wildlife; and various aspects of one or more building facilities including processes and machinery operating within the buildings.

The amount and type of information presented on displays 106, 515 is limited only by the ability to sense the desired parameters, and to communicate the sensed information to display systems 100 (FIG. 1), 400 (FIG. 4), 500 (FIG. 5). Further, the number and type of subsystems that can be controlled using one or more customizable displays 106 (FIGS. 1 and 4), 515 (FIG. 5) is limited only by the ability of the operator to enter control selections, and the ability of display systems 100, 400, 500 to transmit the control selections to the subsystems being controlled.

Figure 8:
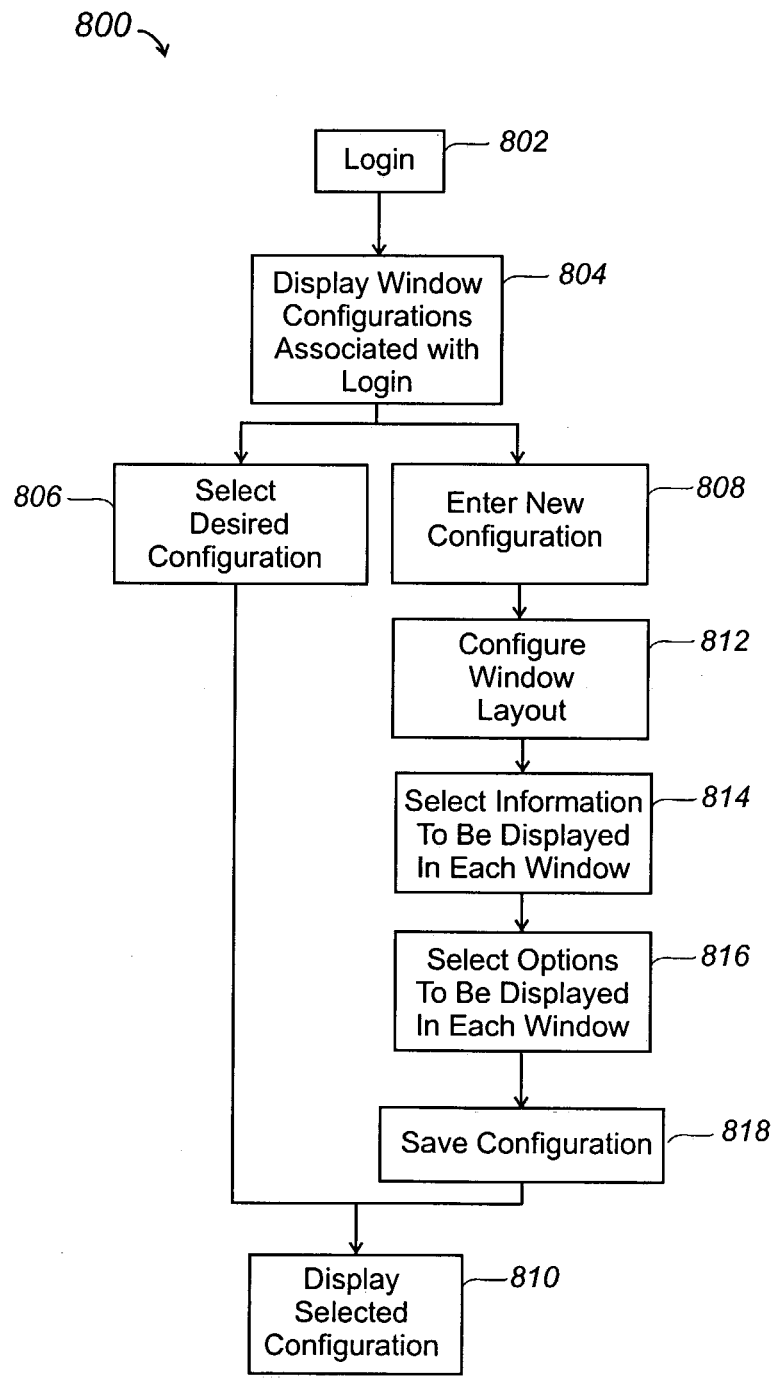
FIG. 8 is a flow diagram of an embodiment of a process for configuring a user's display.

Referring to FIGS. 4 and 8, FIG. 8 is a flow diagram of an embodiment of a process 800 for initially configuring display 106. When a user begins a session, the user is requested to login in process 802. Display processor 114 determines whether any window configurations were previously stored for the user. Process 804 presents option 806 to allow the user to select from among existing configurations, and option 808 to allow the user to enter a new window configuration. If the user selects an existing configuration, process 810 displays the selected configuration on display 106.

When a user selects option 808 to enter a new configuration, process 812 presents options in display 106 to configure a layout for the windows. Process 812 can utilize any suitable user interface to allow the user to enter the number, size, and location of each window in display 106. Once the window configuration is finished, process 814 presents options in display 106 to select the information to be displayed in each window. Combinations of information from various subsystems can be displayed within the same window or in separate windows. For example, video images from a video camera can be overlaid with textual information from other sensors. A user can also designate a window as being "common" to two or more of the other windows, such as common window 1C associated with windows 1A and 1B.

Further, certain types of information can be automatically assigned to a particular window based on the purpose for which display systems 404 are being used. For example, the Federal Aviation Administration requires certain primary flight information to be available to the crewmembers at all times during flight. When user station 408 is being configured as an avionics display system 500 (FIG. 5), HUD window 610 (FIG. 6) and HSID window 612 (FIG. 6) can be automatically placed in the center of display 600. Each crewmember can then configure windows for the remaining areas of the display 600 based on their own preferences.

Once a particular type of information is assigned for a window, the user is presented with related options that can be included in the window, or in the associated common window in process 816. Process 818 allows the user to assign a name to the configuration and save the configuration.

The capability to customize the information in one or more windows in display 106 allows operators to configure a display that is most useful to them. Login information can be shared across display systems 408 via network 116 to allow the user to access saved configurations from any user station 408 connected to network 116.

Display area 104 of display device 102 is sized to accommodate the amount of information that is desired to be available to operators responsible for monitoring and controlling a system. Further, the information is scaled so that it can be easily read by the operator. For example, in an aircraft, each crewmember can be provided with at least one 18 inch by 11 inch display area 104 on a flat panel display device 102. In other systems, display devices 102 with additional or less display area 104 can be utilized.

In some embodiments, a default window configuration can be displayed for each operator based on the operator's role. Display device 104, or other suitable option selection device, can include options to select between different roles that an operator can assume. For example, an operator can choose between role options as primary pilot, co-pilot, flight engineer, maintenance personnel, or flight attendant. When an operator switches from one role to another, the default window configuration for the new role can automatically replace the information displayed on the operator's display 106. The default window configurations can be preset by the operator to display information and options that are preferred by the operator when performing each particular role. A default set of options and information can be presented that is most likely to be useful to the operator assuming the role. Further, some roles may have access to control and monitor subsystems that other roles do not. In these situations, login information can be used to associate a particular operator with the role(s) they are allowed to assume, thereby helping to prevent unauthorized access to various subsystems. A time-out feature can also be included to automatically log the operator off the system after a pre-specified period of non-use.

While the present disclosure describes various embodiments of customizable display systems, it will be understood that many variations and modifications of the embodiments disclosed herein may be made while remaining within the scope of the following claims. These embodiments are illustrative and the scope of the claims is not limited to them. For example, those having ordinary skill in the art will readily implement the processes necessary to provide the structures and methods disclosed herein, and will understand that materials, dimensions, processes, and other parameters can be varied to achieve desired apparatus, methods, and systems within the scope of the following claims.

What is claimed is:

1. A method for configuring windows in a display comprising:
    presenting options to enter the number, size, and location of each window in the display;
    presenting options to select information to be displayed in each window; and
    presenting an option to allow a user to designate a window that is common to at least two other windows.

2. The method according to claim 1 further comprising:
    presenting options that can be included in each window, wherein the options can be displayed in the common window associated with each window.

* * * * *